Aug. 25, 1970   P. G. STEPHAN   3,525,428

MULTIPLE CONTAINER PACKAGE

Filed June 10, 1968

*INVENTOR*
PAUL G. STEPHAN

BY

*ATTORNEY*

3,525,428
MULTIPLE CONTAINER PACKAGE
Paul Glenn Stephan, Landenberg, Pa., assignor to E. I. du Pont de Nemours and Company, Wilmington, Del., a corporation of Delaware
Filed June 10, 1968, Ser. No. 735,848
Int. Cl. B65d 71/00, 65/18
U.S. Cl. 206—65          7 Claims

ABSTRACT OF THE DISCLOSURE

A package for cans arranged in two parallel rows comprising a web of heat-shrunken, thermoplastic film on the bottom, sides, and parts of the top and ends of the grouping of cans and a top closure of flexible material bonded to the longitudinal edges of the thermoplastic film.

BACKGROUND OF THE INVENTION

One of the most widely used packages for canned beverages is the multi-pack, comprising a grouping of from four to eight cans in a common assemblage. One design for such a package comprises a grouping of cans overwrapped in a tubular web of heat shrunken thermoplastic film having finger receiving holes in the overwrap. This design generally requires greater strength of the overwrap on the package top, where the finger holes are located than on the package sides and bottom. In practice, such overwraps sometimes are formed from two sections of thermoplastic film which are side sealed together to form a tube prior to the heat shrinking of the overwrap. For example, a one-mil thickness web of heat-shrinkable polyethylene can be used on the bottom and sides of the package and a one-and-one-half mil thickness web on the top, with both webs sealed to each other to form a tube. While this provides a stronger web in the area of the greatest stresses on the overwrap, the use of two heat-shrinkable films to form the overwrap complicates the manufacture of the package.

Another design employs a tubular sleeve of heat-shrinkable thermoplastic film onto which is bonded a separate reinforcing strip in the area of the finger holes. This package provides for a strengthened top portion of the overwrap but still requires that a double layer be used in the fabrication of the top of the package's overwrap to achieve the desired overwrap strength in the package's finger-hole area.

In both designs of "six-pack" packages described a continuous heat-shrinkable thermoplastic film tube is formed around the grouping of cans by heat or fusion sealing at least one thermoplastic film edge to another. This requires precise sealing equipment to prevent burn-through of the webs while forming seals of the desired tear strength.

SUMMARY OF THE INVENTION

The instant invention provides a thermoplastic film package which gives the desired strength on the top portion of the package, yet is easy and economical to manufacture. Specifically, the instant invention provides an improvement in a package comprising a plurality of containers held in juxtaposed arrangement by a heat-shrunk thermoplastic web conforming to the containers' contours, the improvement wherein the web is retained by a heat unshrinkable flexible band joined to the longitudinal edges of the web along the top of the package by an adhesive bond.

DESCRIPTION OF THE PREFERRED EMBODIMENTS

Thermoplastic materials which can be used to form the web in the package of the instant invention must be heat shrinkable to a sufficient extent to conform to the general contours of the containers being packaged, and strong enough to retain them in the juxtaposed position. Adequate heat shrinking characteristics are generally present in uniaxially oriented films with the stretch axis running normal to the flow path of the cans being packaged. Films which can be used in this invention include oriented films of polymers such as polypropylene, polyvinylidene chloride copolymers, ethylene/vinyl acetate copolymers, polyvinyl chloride, polyethylene terephthalate, polyethylene and polystyrene. For greatest flexibility in manufacturing, biaxially oriented films are preferred for use in the packages of the instant invention, and biaxially oriented polyethylene terephthalate film, such as 65HS "Mylar" polyester, commercially available from E. I. du Pont de Nemours and Company, has been found particularly suitable for use in the instant invention. Generally, films having a thickness of at least one mil are sufficiently strong for use in the instant invention.

The band of flexible material used as a closure for the heat shrinkable film must be heat unshrinkable. That is, the material must undergo no substantial dimensional change at the temperatures at which the sheath film is heat shrunk. Materials which can be used for this closure include fibrous cellulosic products such as papers, e.g., kraft, pouch, glassine, bleached parchments and extensible krafts; thermoplastic materials such as solid unoriented films of polyethylene, polypropylene, nylon, and polyethylene terephthalate; fibrous thermoplastic web materials such as "Typar" spunbonded polypropylene, "Reemay" spunbonded polyester, and "Tyvek" spunbonded polyethylene. Paper products, when used as the closure band, can have a coating of lacquer or polyethylene to modify the surface characteristics of the band, for example, to impart a water resistant surface. Of the foregoing materials, "Tyvek" spunbonded polyethylene has been found especially satisfactory for use in the packages of the instant invention.

The thermoplastic sheath and the closure therefor are adhesively bonded together. Generally, an overlap along the respective longitudinal edges of the flexible band and the thermoplastic web of about from one-quarter to one-half inch is sufficient to provide adequate adhesion for the packages of the instant invention. Adhesives which can be used in the instant invention include heat sensitive adhesives which are blends of waxes and ethylene/vinyl acetate copolymer fortifiers and hot melt vinyl resins such as "Elvax." Pressure sensitive tapes, coated with adhesive on one or both sides, can also be used to bond the sheath and the closure together.

Figure 1:
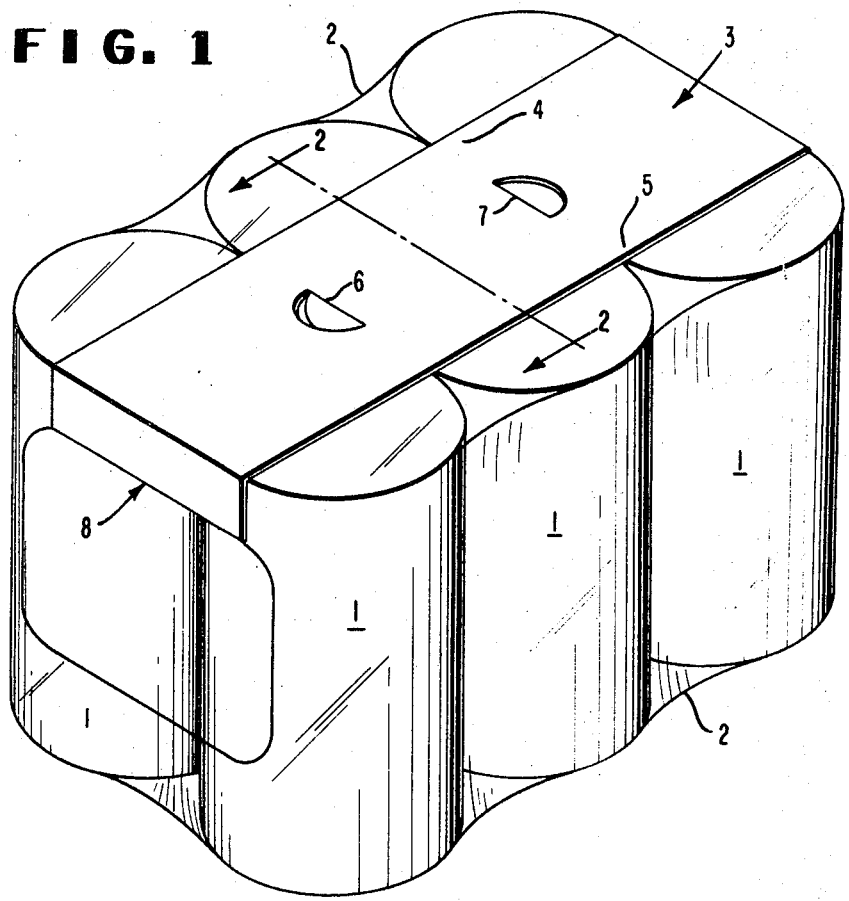
FIG. 1 is a perspective view of a package of this invention.

A preferred embodiment of the instant invention is illustrated in FIG. 1, wherein a grouping of cans 1 are packaged with a heat shrinkable thermoplastic sheath 2 having a closure 3 which is bonded to the sheath 2 along the longitudinal edge portions 4 and 5. Finger holes 6 and 7 are formed in the closure 3 above the void spaces formed by the grouping of four adjacent cans.

Figure 2:
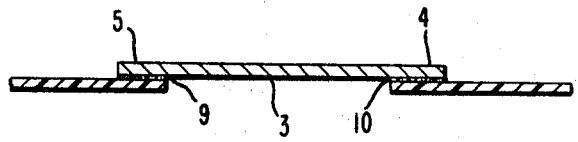
FIG. 2 is a transverse sectional view of a portion of the overwrap of the package taken across section 2—2.

FIG. 2 shows a fragmentary transverse sectional view of the closure 2 taken across section 2—2 in FIG. 1. The sheath 2 and closure 3 are bonded to each other along longitudinal edges 4 and 5 of closure 3 by adhesive means 9 and 10.

Finger holes can be formed in the non-heatshrinkable closure above the void spaces formed by the grouping of any four adjacent cans. Such holes are usually die cut when the top piece is fabricated prior to assembly of the package, or, when the closure is a thermoplastic material, melted with a hot shaped tubular heating element, so that a polymeric bead is formed around the periphery of the hole. Generally, one or two finger holes are adequate for the comfortable carrying of a package of the instant invention. When one-hole packages are manufactured, the package can be easily carried by placing one finger in the carrying hole and the thumb over the end of the package, indicated as region 8 in FIG. 1.

In the commercial production of the packages of this invention the heat-shrinkable, thermoplastic web is fed from a supply roll into the lower section of the tube forming device where the lower portion of the tubular sleeve is formed around the bottom, sides and parts of the top of the prearranged groups of containers. The flexible wrapping material for forming the top piece of the tubular overwrap is fed from its supply roll simultaneously into the upper section of the tube forming device where it is adhesively secured to the edges of the formed thermoplastic web to complete the formation of a loose tubular overwrap around the prearranged groups of containers. After the tubular overwrap is formed around the grouping of containers it is severed between groupings beyond the confines of the individual container groupings and the finger hole or holes are formed in the top piece of the overwrap being severed from the formed tube.

Each package consisting of the grouped containers and the loosely-fitting surrounding tubular sleeve is then passed through a heat shrinking chamber. Typical heat shrinking temperature employed while packaging at the rate of 120 packages per minute using 240EH "Clysar" film is 280° F. The heat-shrinking portion of the overwrap shrinks in all directions during this operation yielding a package as shown in FIG. 1. The shrinking forces exerted by the thermoplastic film causes the overwrap to tightly enclose the containers on six sides so that relative container-to-container movement is restricted under normal handling conditions. The heat required to shrink the overwrap is normally transmitted by use of circulated hot air currents or by radiant heat transfer such as emitted from infra-red light sources or from electrically energized resistance heating elements.

The packaging of the instant invention presents many advantages over packages previously used in the art. The heat unshrinkable top closure restrains the sheath during the heat shrinking process, and thereby prevents it from shrinking past the package ends, thus insuring that the ends will be partially closed. Further, the adhesive bonding of the nonshrinkable closure retains the advantages of packages wrapped in thermoplastic film while eliminating the need for the sophistocated equipment required to heat fuse thermoplastic films without melting or penetrating the films. Further, the provision of a non-heat shrinkable closure permits the printing of an advertising message on the wrapper, which has heretofore been impossible prior to heat shrinking because of the somewhat unpredictable physical changes of the film during the heat shrinking process, and likewise difficult after the heat shrinking due to the conformation of the wrap to the contours of the packaged article.

I claim:
1. In a package comprising a plurality of containers held in juxtaposed arrangement by a heat-shrunk thermoplastic web conforming to the containers' contours, the improvement wherein the web is retained by a heat unshrinkable flexible band joined to the longitudinal edges of the web along the top of the package by an adhesive bond, the width of the band being less than the width of the package and the length of the band being greater than the length of the package, the band situated and joined to the web so as to extend past two edges of the top of the package, the band having at least one finger hole formed therein above the void space formed by the grouping of any four adjacent containers.

2. A package of claim 1 wherein the flexible band is fibrous cellulosic material.

3. A package of claim 1 wherein the flexible band is fibrous thermoplastic web material.

4. A package of claim 3 wherein the band is spunbonded polyethylene.

5. A package of claim 1 wherein the thermoplastic web is biaxially oriented polyethylene terephthalate film.

6. A package of claim 1 wherein the adhesive bond is a heat sensitive adhesive.

7. A package of claim 6 wherein the adhesive is a hot-melt vinyl resin.

References Cited
UNITED STATES PATENTS

| | | | |
|---|---|---|---|
| 2,980,245 | 4/1961 | Stoker | 206—46 |
| 3,217,874 | 11/1965 | Potter | 206—65 |
| 3,276,671 | 10/1966 | Fleitman. | |
| 3,410,396 | 11/1968 | Copping | 206—65 |

WILLIAM T. DIXSON, Jr., Primary Examiner

U.S. Cl. X.R.
206—45.33